UNITED STATES PATENT OFFICE.

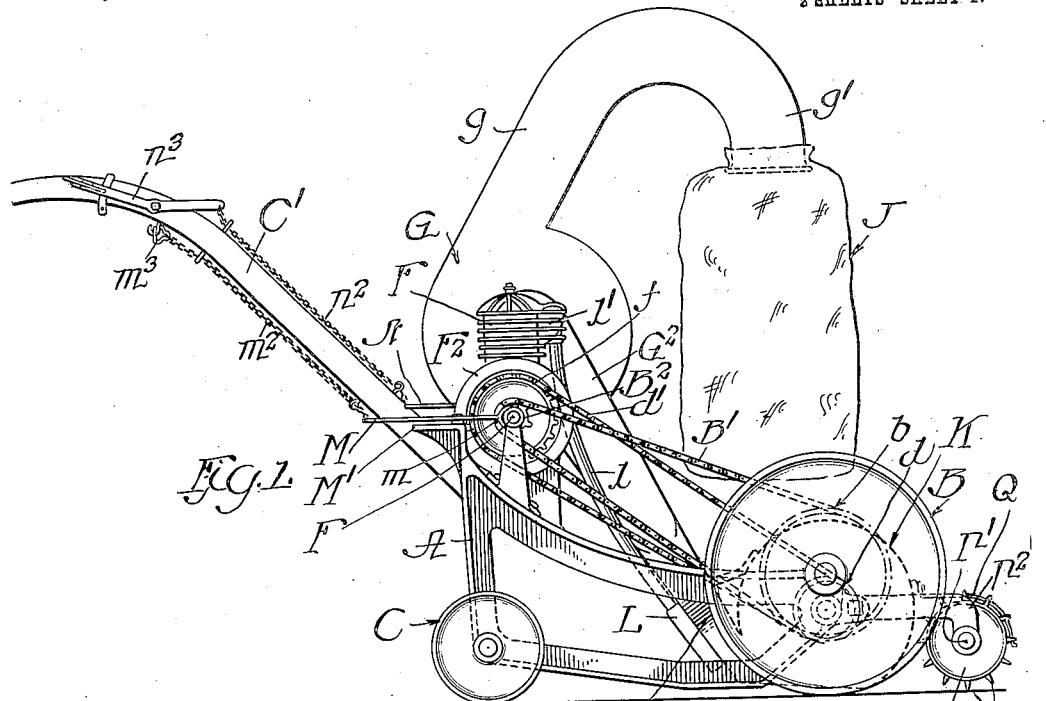
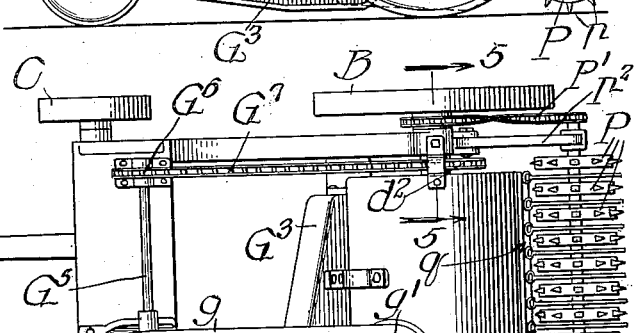
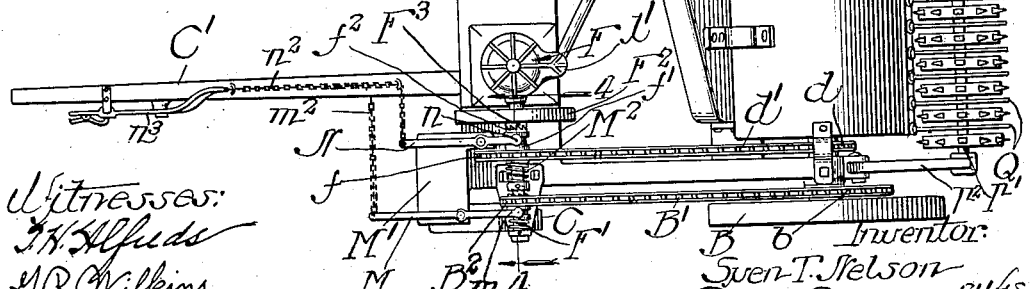

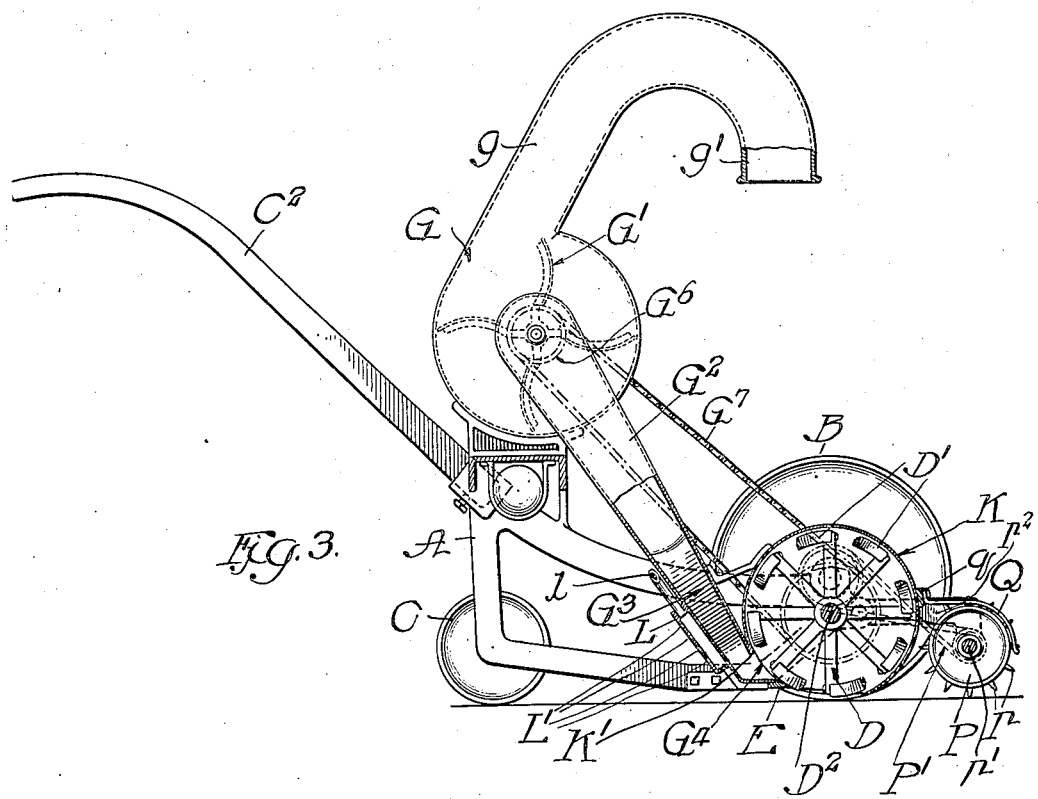
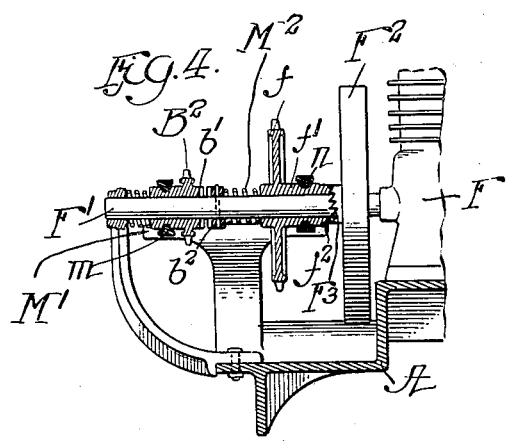
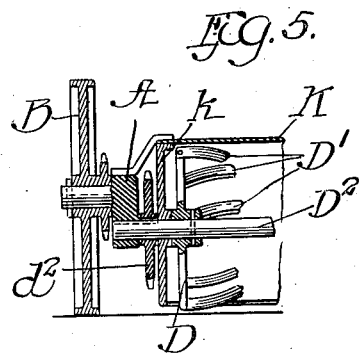

SVEN T. NELSON, OF CHICAGO, ILLINOIS.

LAWN-MOWER.

962,780.  Specification of Letters Patent.  Patented June 28, 1910.

Application filed December 6, 1909. Serial No. 531,497.

*To all whom it may concern:*

Be it known that I, SVEN T. NELSON, a citizen of the United States, and a resident of Chicago, in the county of Cook and State of Illinois, have invented certain new and useful Improvements in Lawn-Mowers; and I do hereby declare that the following is a full, clear, and exact description thereof, reference being had to the accompanying drawings, and to the letters of reference marked thereon, which form a part of this specification.

This invention relates to an improvement in lawn mowers and consists of the combination of parts hereinafter described and more particularly pointed out in the appended claims.

In the drawings:—Figure 1 is a side elevation of my improved lawn mower. Fig. 2 is a top plan view of the same. Fig. 3 is a vertical section through Fig. 2 on the line 3—3 thereof. Fig. 4 is a partial vertical section through Fig. 2 on the line 4—4 thereof. Fig. 5 is a partial vertical section through Fig. 2 on the line 5—5 thereof.

A indicates the frame of the lawn mower, B, B, C, C, the front and rear wheels, respectively, upon which said frame is mounted and D, the rotary cutter member provided with blades $D^1$ which are adapted to cut the grass against a horizontal fixed blade E. These parts are mounted and arranged as usual except that no gearing is provided between the ground wheels B, B and the cutter member shaft by means of which the same is driven as is the case in the usual machine.

$D^2$ indicates the cutter member shaft which is loosely journaled in the frame A. A sprocket wheel $d$ is keyed to said shaft. Said sprocket wheel is driven by means of a sprocket chain $d^1$ from a sprocket wheel $f$ which is loosely journaled on a shaft $F^1$ of a gasolene motor F mounted in any suitable manner on the rear of the frame above the ground wheels C, C. $F^2$ indicates the fly wheel of the motor. Said sprocket wheel $f$ is provided with a hub $f^1$ having clutch teeth $f^2$ which are adapted to engage clutch teeth $F^3$ formed on the hub of the fly wheel.

Arranged centrally of the machine frame A and at the rear thereof is a suction producing device comprising a fan casing G in which rotates a fan $G^1$. At the upper exhaust end of said fan casing is arranged an exhaust pipe $g$ which projects forwardly and is then curved downward in the form of a discharge spout $g^1$ from which is suspended a bag J. To the intake end of the drum G is attached a suction pipe $G^2$ which is expanded fanwise at its lower end to form a vacuum chamber as indicated at $G^3$. The bottom wall of said vacuum chamber rests on the blade E and is provided on its front with a slot $G^4$ which runs the length of said blade and has its lower boundary formed by said blade. The knives themselves are inclosed by a drum K provided with ends $k$. The circumferential wall of said drum terminates on one side at the upper edge of the slot $G^4$ as indicated at $K^1$ and at the other side terminates a short distance forward of a vertical plane through the axis of the drum, there being thus left a wide slot or longitudinal opening in the drum to permit the grass to enter the cutting space.

$G^5$ indicates the shaft of the lower blower (see Fig. 2) which is supported on the frame in any convenient manner and projects to one side of the frame where it is provided with a sprocket wheel $G^6$. Said sprocket wheel is driven by a sprocket chain $G^7$ from a sprocket wheel $d^2$ (see Fig. 5) which is keyed to the cutter shaft $D^2$.

It is apparent that as the cut grass falls on the blade E it will be drawn up into the suction chamber $G^3$ and thence through the pipe $G^2$ whence it will be forced through the pipe $g$ down through the spout $g^1$ and into the bag J. The suction in the pipe $G^2$ also produces a partial vacuum in the drum K so that blades of grass, seeds of weeds and other similar particles, which might otherwise be carried around by the knives and deposited on the ground, will be drawn into the suction chamber, then into the collecting bag J. This action is a great advantage as it prevents the seeds of dandelions and other similar plants from being scattered over the lawn in the use of the mower.

In order to prevent wet grass from clogging the tube $G^2$ or the opening $G^4$, I provide a box L on the bottom of said suction chamber $G^3$ near its lower end and connect said box by means of a tube $l$ to the exhaust of the engine indicated at $l^1$. The hot gases from the exhaust thus enter the box L and pass in contact with the lower wall of the suction chamber so as to heat it, and this heat is imparted through the contiguous parts to the wet grass which sticks to the walls of said chamber $G^3$ and the tube $G^2$ and dries it; after it becomes dry the grass is readily detached from the walls of the chamber, or from the walls of the tube, by means of the draft of air passing through them. The box L is provided with suitable openings $L^1$ to permit the pressure of the exhaust to be relieved.

It may sometimes be desirable to run the lawn mower over the ground by power and to this end I provide the hub of one of the traction wheels B with a sprocket wheel $b$ and connect said sprocket wheel by a sprocket chain $B^1$, with a sprocket wheel $B^2$ which is loosely mounted on the motor shaft $F^1$. Said sprocket wheel is provided with a clutch member $b^1$ which is adapted to engage the teeth of a clutch member $b^2$ rigidly secured to rotate with the said shaft $F^1$. It is apparent that upon the engagement of said clutch members the ground wheel B will be driven from the motor F.

The frame of the mower machine is provided with guide handles $C^1$, $C^2$ by means of which the machine may be pushed, or by means of which it may be guided when the machine is power driven.

M, N indicate levers pivotally mounted on a plate $M^1$ formed at the rear of the frame, which levers are provided with yokes $m$, $n$ which are arranged to throw the clutch members of the sprocket wheels $B^2$ and $f$, respectively, into and out of engagement with the driving clutch members. As illustrated, said levers are operated by means of chains $m^2$, $n^2$ which are arranged to slide in staples secured to one of the handles $C^1$,—the one $m^2$ being operated by means of a handle $m^3$ and the other by means of a spring controlled lever $n^3$ which is pivoted to the side of the handle bar. Any other suitable mechanism for operating the clutch members may be used. A spring $M^2$ coiled about the shaft $F^1$ engages between the fixed clutch member $b^2$ and the hub of the sprocket wheel $f$, so as to normally hold the clutch teeth of said wheel in engagement with the clutch teeth on the hub of the fly wheel $F^2$.

In order to prevent small stones or twigs or other particles from entering the knife cutting space, I prefer to mount forward of the drum K a rotary rake P provided with teeth $p$. Said rotary rake is journaled on a shaft $p^1$ mounted in vertically adjustable arms $p^2$ and driven by means of a belt $P^1$ from the hub of one of the driving wheels B, in a direction opposite to that in which the ground wheels are turning, so that any stones or twigs that are caught between the teeth will be pushed away from the drum K. To prevent said twigs or stones from being carried up by the teeth and thrown back of the rake, I provide on the drum K a series of forward and downwardly curved wires Q which lie between the teeth of the rotary rake. Said wires Q are secured to a bar $q$ which is riveted or otherwise attached to the forward wall of the drum K.

The operation of my improved lawn mower is apparent from the above description. It is pushed and guided over the grass in the usual way by means of the handles $C^1$, $C^2$ and the fan $G^1$ is driven by the motor. As the grass is cut it is drawn up through the pipe $G^2$ and discharged into the bag J. When said bag is filled, it is removed from the spout $g^1$, emptied and replaced and the operation of the machine continued. The operation of the rake wheel removes from the path of the machine any stones, twigs or other things of that kind which might otherwise clog the knives. The provision of the auxiliary suction chamber formed by the drum K insures the collection of all the smaller pieces of grass, which might otherwise escape the suction chamber, and is of especial advantage in that it collects the seeds of weeds which would ordinarily be scattered over the lawn and be thus widely disseminated by the action of the mower. The drying box L prevents wet grass from clogging the suction chamber and makes it possible to use the machine in cutting wet grass which may be more readily cut than dry grass.

It is apparent that the mechanical details of construction herein shown and described, may be variously modified without departing from the spirit of my invention and I do not wish to be limited by them except as pointed out in the appended claims.

I claim as my invention:—

1. In a lawn mower, in combination with a rotary cutting member and a fixed cutting member against which said rotary member engages, a suction chamber located above the horizontal plane passing through said fixed cutting member provided with a slot opening toward said rotary cutting member, a suction pipe leading from said suction chamber, means for producing suction in said suction pipe, a delivery spout connected with said suction pipe, and a collecting member removably secured to said discharge spout.

2. In a lawn mower, in combination with a rotary cutting member and a fixed cutting member against which said rotary member engages, a suction chamber located above the horizontal plane passing through said fixed cutting member provided with a slot opening toward said rotary cutting member, an auxiliary suction chamber surrounding said rotary cutting member, said auxiliary chamber opening about the bottom of the rotary cutting member, and being connected with said first named suction chamber, a suction pipe leading from said suction chamber, means to produce suction in said pipe, a discharge spout connecting with said suction pipe, and a collecting member removably secured to the discharge spout.

3. In a lawn mower, in combination with a rotary cutting member and a fixed cutting member against which said rotary member engages a suction chamber located above the horizontal plane passing through said fixed cutting member provided with a slot opening toward said rotary cutting member, a suction pipe leading from said suction chamber, means for producing suction in said pipe, means for heating said suction pipe and said suction chamber, a delivery spout connected with said suction pipe, and a collecting member removably secured to said discharge spout.

4. In a lawn mower, in combination with a rotary cutting member and a fixed cutting member against which said rotary member engages, a suction chamber located above the horizontal plane passing through said fixed cutting member and provided with a slot opening toward said rotary cutting member, a suction pipe leading from said suction chamber, a rotary fan and fan-casing adapted to produce suction in said suction pipe, a collector connected with said suction pipe, an explosive engine adapted to drive said fan, said motor having an exhaust, a box secured to said suction pipe, and means for connecting the exhaust of said engine with said box.

5. In a lawn mower, in combination with the rotary cutting member and a fixed cutting member against which said rotary member engages, a suction chamber located above the horizontal plane passing through said fixed cutting member and provided with a slot opening toward said rotary cutting member, a suction pipe leading from said suction chamber, an exhaust fan and casing adapted to produce suction in said suction pipe, a motor adapted to drive said exhaust fan, and means for operatively connecting the rotary cutter to said motor shaft.

6. In a lawn mower, in combination with a rotary cutting member and a fixed cutting member against which said rotary cutting member engages, a suction chamber located above the horizontal plane passing through said fixed cutting member and provided with a slot opening toward said rotary cutting member, a suction pipe leading from said suction chamber, an exhaust fan and casing connected with said suction pipe, a motor adapted to drive the exhaust fan, means for driving said rotary cutting member from the motor shaft, and a rotary rake adjustably mounted in advance of said rotary cutter.

7. In a lawn mower, in combination with a rotary cutting member and a fixed cutting member against which said rotary cutting member engages, a suction chamber located above the horizontal plane passing through said fixed cutting member and provided with a slot opening toward said rotary cutting member, a suction pipe leading from said suction chamber, an exhaust fan and casing connected with said suction pipe, a motor adapted to drive the exhaust fan, means for driving said rotary cutting member from the motor shaft, a rotary rake in advance of said rotary cutter, and a series of forward and downwardly curved teeth supported above said rotary rake and depending in front of and between the teeth of said rotary rake.

8. In a lawn mower, in combination with a frame provided with ground wheels, a rotary cutting member carried by said frame, a fixed cutting member against which said rotary cutting member engages, a suction chamber located above the horizontal plane passing through said fixed cutting member provided with a slot opening toward said rotary cutting member, an auxiliary suction chamber inclosing the rotary cutting member and provided with an opening at its base which communicates with said first suction chamber, a suction pipe leading from said first named suction chamber, an exhaust fan and casing connected with said first named suction pipe, an explosive engine adapted to drive said exhaust fan, means for driving the rotary cutting member from said engine shaft, means for driving one of the carrying wheels of the lawn mower from said engine secured to the suction pipe, and a rotary rake member adjustably mounted on the forward part of the lawn mower frame in advance of the rotary cutting member.

In testimony, that I, claim the foregoing as my invention I affix my signature in the presence of two witnesses, this 1st day of December, A. D. 1909.

SVEN T. NELSON.

Witnesses:
CLARENCE E. MEHLHOPE,
GEORGE R. WILKINS.